(12) United States Patent
Hariharan

(10) Patent No.: US 11,190,103 B2
(45) Date of Patent: Nov. 30, 2021

(54) LED DRIVER SYSTEMS AND METHODS

(71) Applicant: Maxim Integrated Products, Inc., San Jose, CA (US)

(72) Inventor: Suresh Hariharan, Livermore, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 16/599,585

(22) Filed: Oct. 11, 2019

(65) Prior Publication Data

US 2020/0366206 A1    Nov. 19, 2020

Related U.S. Application Data

(60) Provisional application No. 62/849,481, filed on May 17, 2019.

(51) Int. Cl.
*H02M 3/158* (2006.01)
*H02M 3/07* (2006.01)
*H05B 45/37* (2020.01)

(52) U.S. Cl.
CPC ......... *H02M 3/1584* (2013.01); *H02M 3/07* (2013.01); *H05B 45/37* (2020.01); *H02J 2207/20* (2020.01)

(58) Field of Classification Search
CPC .... H05B 45/38; H05B 33/08; H05B 33/0815; H05B 45/37; H05B 33/0818;
(Continued)

(56) References Cited

U.S. PATENT DOCUMENTS 4,031,363 A   6/1977 Freeman et al.
6,037,755 A   3/2000 Mao et al.
(Continued)

FOREIGN PATENT DOCUMENTS

CN         10841843 A     8/2018
DE     102004026383 A1   12/2005
(Continued)

OTHER PUBLICATIONS

Analog Devices Inc., "38VIN Boost µModule Regulator for LED Drive with 10A Switch". Retrieved from the Internet <URL: https://www.digikey.com/en/product-highlight/l/linear-tech/ltm8005-38-vin-38-vout-boost-umodule-led-driver>, Dec. 2018, (26 pgs).
(Continued)

*Primary Examiner* — Monica C King
(74) *Attorney, Agent, or Firm* — North Weber & Baugh LLP; Michael V. North

(57) ABSTRACT

Described herein are embodiments for systems and methods LED driver. In one or more embodiments, the LED driver may operate in a boost mode to charge a capacitor using a power source or in a boost mode to use the charged capacitor to provide current to a load, such as an LED string. In one or more embodiments, the LED driver uses a single inductor for boost mode operation or buck mode operation. Such embodiments simplify the LED driver and therefore provide an economic advantage. In one or more embodiments, the power source is disconnected in the buck mode, such that the capacitor may be discharged to a low voltage. Therefore, the capacitor may need smaller capacitance to deliver the same discharge energy which otherwise requires a capacitor with larger capacitance.

20 Claims, 7 Drawing Sheets

(58) Field of Classification Search
CPC .. H05B 41/2806; H05B 45/327; H05B 45/355;
H05B 45/3725; H05B 45/375; H05B
33/0827; H05B 33/0857; H05B 41/288;
H05B 45/00; H05B 45/20; H05B 45/46
See application file for complete search history.

(56) References Cited

U.S. PATENT DOCUMENTS

| 8,102,162 | B2 | 1/2012 | Moussaoui et al. |
| 8,569,963 | B2 | 10/2013 | Walters |
| 8,674,620 | B2 | 3/2014 | Capodivacca et al. |
| 8,941,404 | B2 | 1/2015 | Bernardon |
| 9,351,352 | B2 | 5/2016 | Szolusha |
| 2005/0272482 | A1 | 12/2005 | Shinoda |
| 2012/0313538 | A1 | 12/2012 | Kumar et al. |
| 2019/0230756 | A1* | 7/2019 | Jiang .................. H05B 45/00 |

FOREIGN PATENT DOCUMENTS

| EP | 1987990 B1 | 11/2008 |
| EP | 1643654 B1 | 3/2010 |
| JP | 2007057885 A | 8/2007 |
| WO | 2006027843 A | 3/2006 |

OTHER PUBLICATIONS

Texas Instruments, "TPS92691/-Q1 Multi-Topology LED Driver With Rail-to-Rail Current Sense Amplifier". Retrieved from the Internet: <URL: http://www.ti.com/lit/ds/symlink/tps92691-q1.pdf>, (48 pgs).

* cited by examiner

LED DRIVER SYSTEMS AND METHODS

CROSS REFERENCE TO RELATED APPLICATION

This application claims the benefit under 35 U.S.C. § 119(e) of Provisional Patent Application No. 62/849,481, entitled "LED Driver Systems and Methods," naming as inventor Suresh Hariharan, and filed May 17, 2019. The aforementioned patent document is incorporated by reference herein in its entirety.

A. Technical Field

The present disclosure relates generally to systems and methods for control circuits and regulators. More particularly, the present disclosure relates to LED driver systems and methods.

B. Background

Numerous of such LED applications employ drivers that operate light-emitting diodes (LEDs) for only a relatively short amount of time, i.e., having a relatively short pulse width. Driver Monitoring Systems (DMS), for example, use infra-red LEDs to monitor the status of a driver in a vehicle and provide warnings, e.g., regarding potential driver fatigue, and may initiate appropriate actions to prevent accidents. Such LEDs may be driven at 1.5 A peak current and have a pulse width of about 1 msec., or they may be driven at 4 A to 5 A LED current and may have a pulse width that is only 200 μsec. wide. The number of LEDs in a typically string of LEDs varies from 2 to 4, thus, resulting in an LED voltage of 7 V to 14 V. In addition, voltage drops due to wiring resistance will cause the total string voltage to be higher. Dimming frequencies lie in the range of 10 Hz to 60 Hz. And although the dimming duty cycles are very narrow, current peak values remain relatively high.

In general, many driver applications utilize a single buck-boost converter or a two stage configuration where the first stage is configured as a boost converter and the second stage is configured as a buck converter. However, single buck-boost converters have a major drawback in that they suffer from the negative effects of a high input inductance and input resistance in the wiring, i.e., at the input to the circuit. For example, in applications that operate with a relatively large input inductance and input resistance, such as the lead inductance and resistances that is inherent to wiring that connects to a vehicle battery designed to handle some average power the wires are rated for, a large current drawn over a relatively short duration tends to cause undesired di/dt problems and voltage drops since low duty cycles that tend to be in the 1% to 5% range invariably result in high peak power, e.g., 60 W, even if the average power remains relatively low, e.g., on the order of 5 W to 6 W.

In addition, if power is drawn from the battery only when the LEDs are On, i.e., no power is drawn when the LEDs are Off, peak currents may easily reach 10 A and above. As is commonly known, once a current in a wire rapidly increases, e.g., from 0 A to 10 A, in a relatively short period of time, this causes a relatively large voltage drop across the wire due to resulting high di/dt ratio and also due to IR drops in the wires. In the worst case, this may cause a system failure, e.g., when the large voltage drop causes LEDs to not turn on even at current levels as high as 5 A.

In order to address problems caused by high-inductance and resistance in the cabling, some approaches drive loads such as infrared LEDs with a buck LED driver that is located at the output of a boost converter circuit that, in turn, has a relatively large electrolytic capacitor. Once the boost converter is turned On, the boost output capacitor is charged to a high voltage, while the LEDs are turned off. Once the LEDs are turned back On, the boost converter is turned Off, and the boost output capacitor discharges into the LEDs. A subsequent buck converter is then used to regulate the current flowing though the LEDs. Such designs are relatively costly due to the fact that two converters and switching devices are required, i.e., for both boost and buck converter circuits, which may require two separate ICs.

Accordingly, what is needed are systems and methods that overcome the drawbacks of existing designs.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

FIGURE ("FIG.") 1 shows a prior art boost circuit that may serve as a boost section of a common LED driver.

DETAILED DESCRIPTION OF EMBODIMENTS

Figure 1:
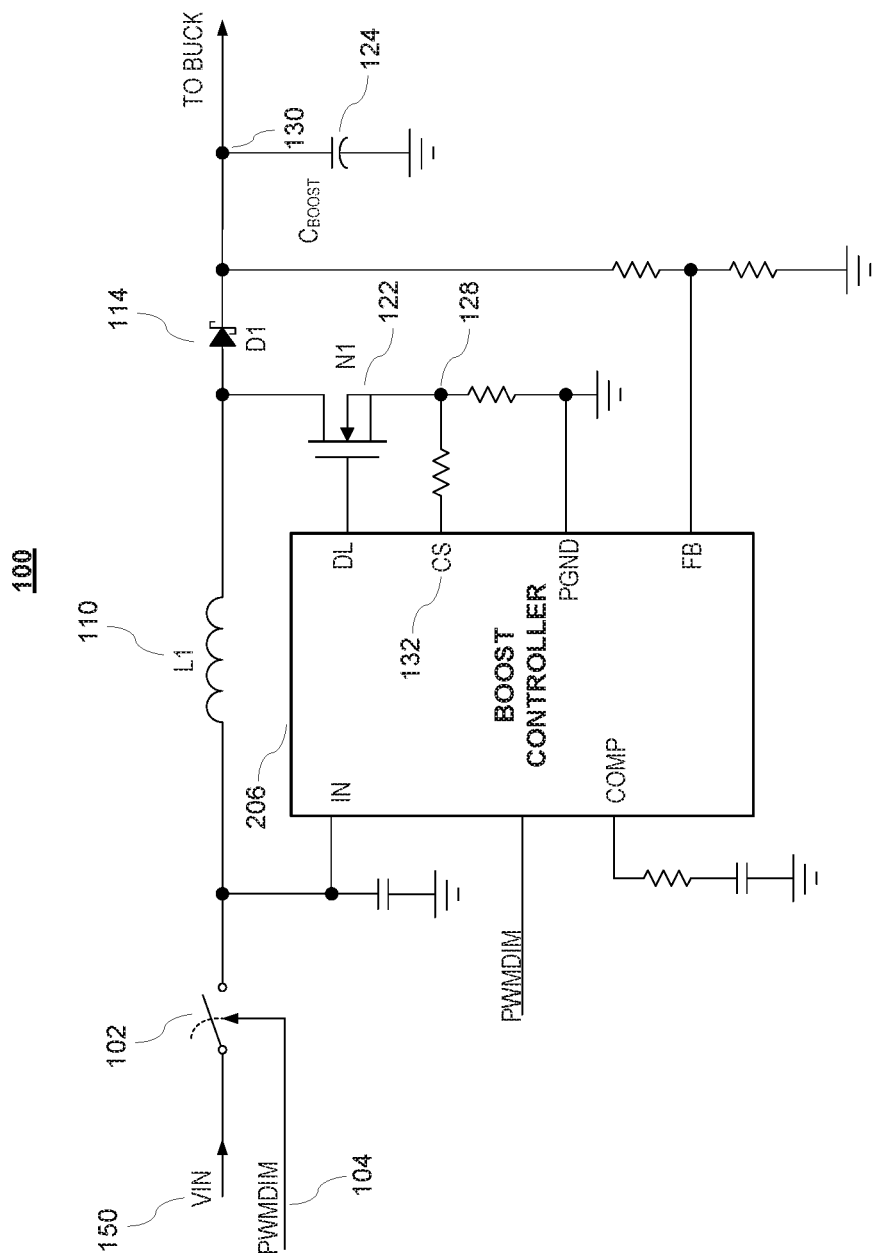

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion components may be described as separate functional units, which may comprise sub-units. Those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

It is noted that embodiments described herein are given in the context of LED drivers, but one skilled in the art shall recognize that the teachings of the present disclosure are not limited to driver applications and may equally be used in other contexts involving buck and boost circuitry.

In this document, LEDs and LED array is used interchangeably. The terms buck, buck circuit, and buck converter, and buck converter sub-circuit are used interchangeably. Similarly, the terms boost, boost circuit, and boost converter sub-circuit are used interchangeably. "Sub-circuit" refers to a combination of circuit components in a circuit. The term switch refers to any type of switch known in the art, e.g., a MOSFET transistor.

FIGURE ("FIG.") 1 shows a prior art boost circuit that may serve as a boost section of a common LED driver. Boost circuit 100 comprises inductor 110, switch 122, diode 114, and capacitor 124 that form a DC-DC regulator. Boost circuit 200 is powered by an input power supply (not shown), e.g., via switch 102 that is controlled by a control signal 104.

In operation, once input switch 102 is closed, the regulating function of boost circuit 100 is used to regulate, via boost controller, 206, a boost voltage at capacitor 124 to, e.g., 30 V to 35 V, by transferring energy from the input power supply to boost capacitor 124. A person of skill in the art will understand that the voltage at node 130, i.e., the voltage on capacitor 124 is regulated to an output voltage (or boost voltage) that is higher than input voltage 150. For purposes of brevity, a description the common operation of a boost circuit is not discussed herein.

Figure 2:
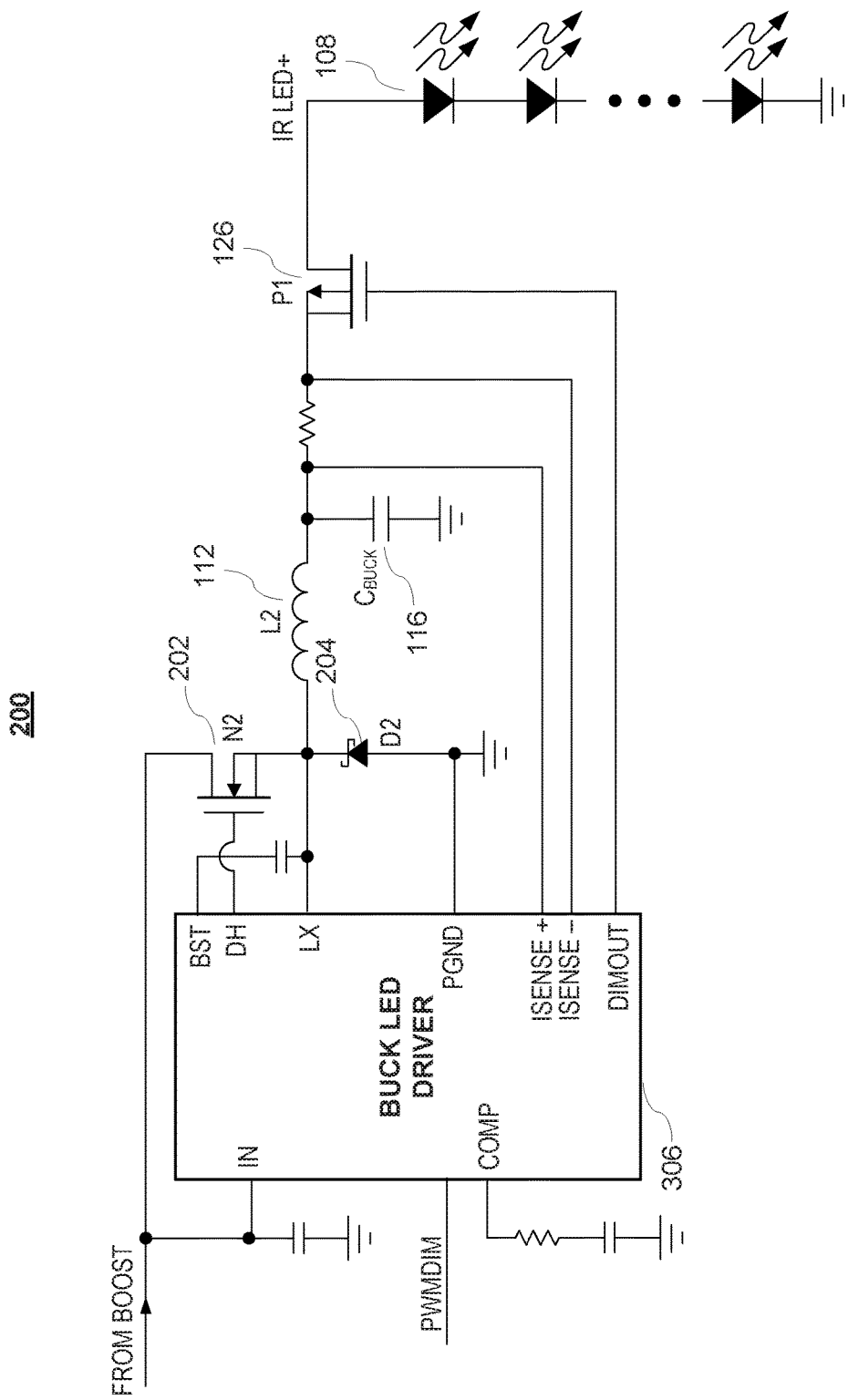
FIG. 2 shows a prior art buck circuit that may serve as a buck section of a common LED driver.

FIG. 2 shows a prior art buck circuit that may serve as a buck section of a common LED driver. Same numerals as in FIG. 1 denote similar elements. As a person of skill in the art will understand, inductor 112, switch 202, diode 204, and capacitor 116 in FIG. 2 form a buck circuit that can be used to drive LED array 108 via buck LED driver 306. For purposes of brevity, a description the common operation of a buck circuit is also not discussed herein.

Figure 3:
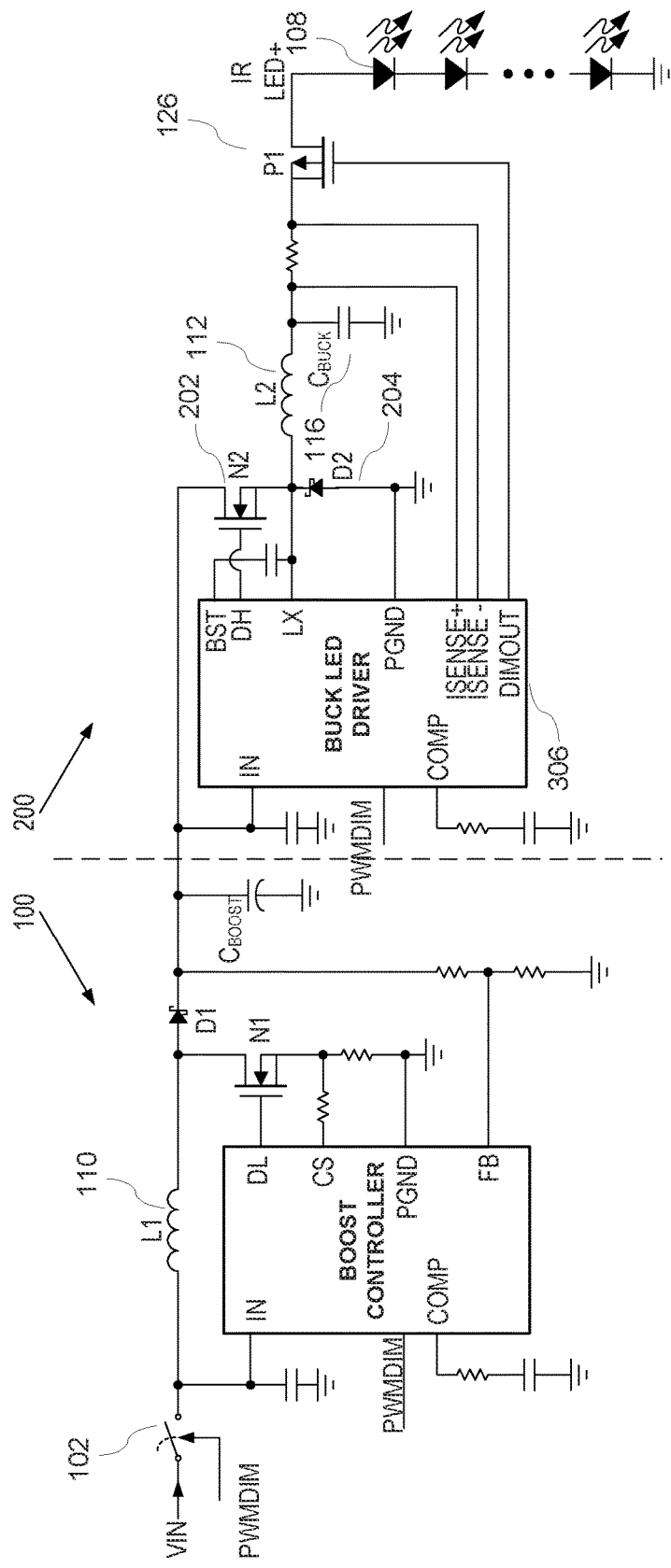
FIG. 3 shows common LED driver that incorporates both circuits shown in FIG. 1 and FIG. 2 and utilizes two controllers.

FIG. 3 shows common LED driver that incorporates both circuits shown in FIG. 1 and FIG. 2 and utilizes two controllers. Components similar to those shown in FIG. 1 and FIG. 2 are labeled in the same manner and have same or similar functions.

Figure 4:
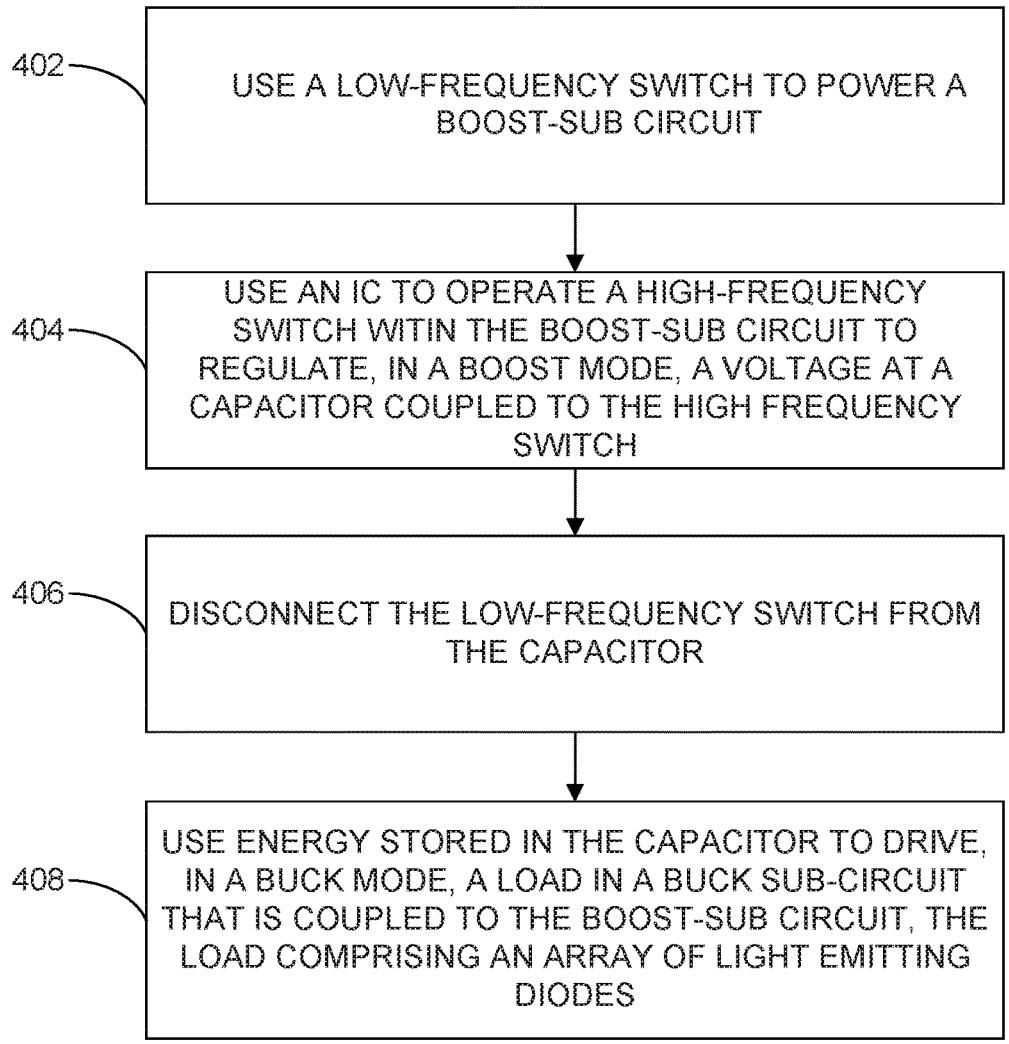
FIG. 4 is a flowchart of an illustrative process for operating an LED driver according to various embodiments of the present disclosure.

FIG. 4 is a flowchart of an illustrative process for operating an LED driver according to various embodiments of the present disclosure. Process 400 for operating an LED driver starts at step 402 when a low-frequency switch is used to power a boost sub-circuit.

At step 404, an IC is used to operate a high-frequency switch in the boost sub-circuit to regulate, in a boost mode, a voltage at a capacitor coupled to the high frequency switch.

At step 406, the low-frequency switch is disconnected from the capacitor.

Finally, at step 406, energy stored in the capacitor is used to drive, in a buck mode, a load in a buck sub-circuit that is coupled to the buck sub-circuit, the load comparing an array of light emitting diodes.

It shall be noted that: (1) certain steps may optionally be performed; (2) steps may not be limited to the specific order set forth herein; (3) certain steps may be performed in different orders; and (4) certain steps may be done concurrently.

Figure 5:
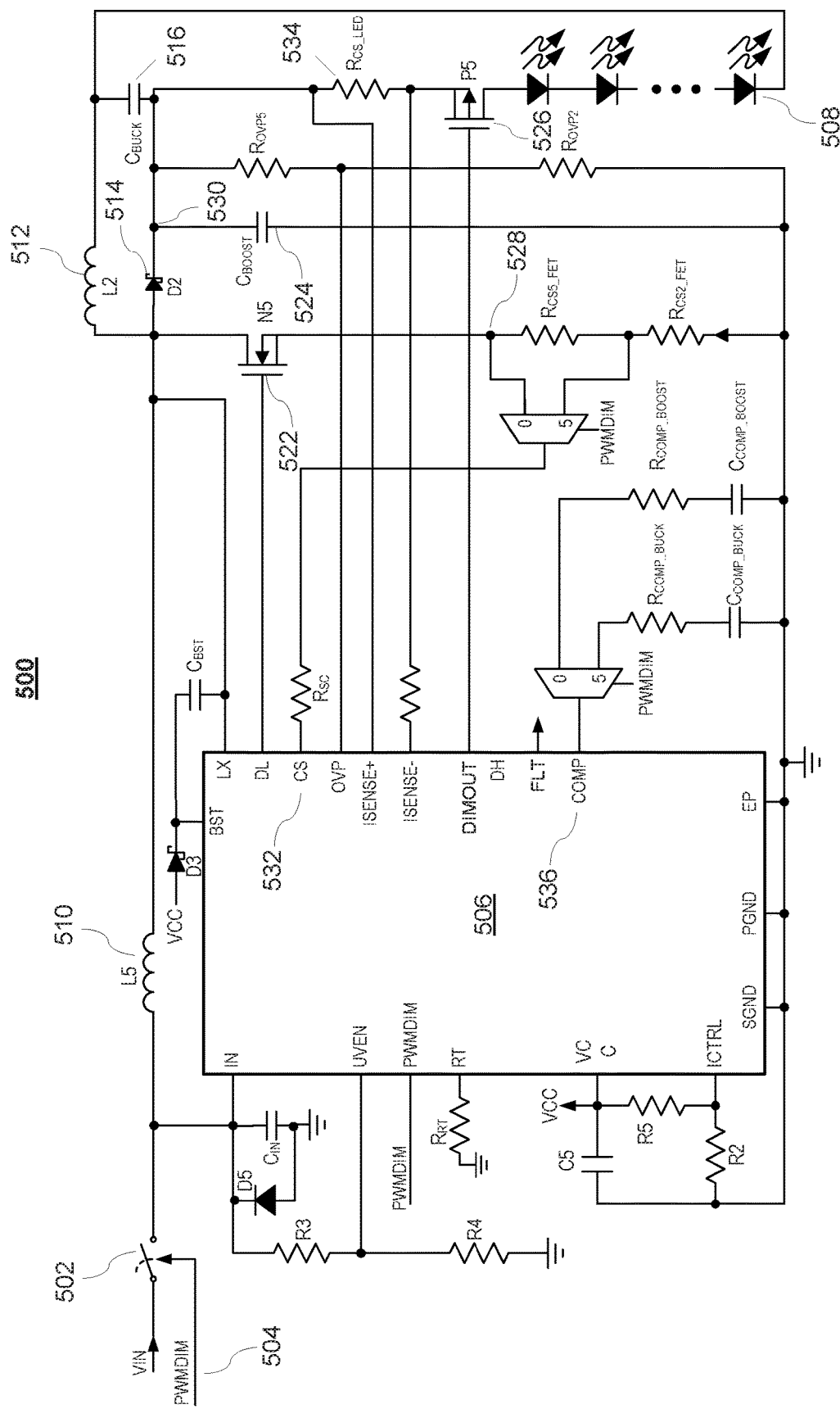
FIG. 5 illustrates an exemplary implementation of an LED driver according to various embodiments of the present disclosure.

FIG. 5 illustrates an exemplary implementation of an LED driver according to various embodiments of the present disclosure. LED driver 500 comprises input switch 502, which may be controlled by pulsed dimming input signal 504 (denoted as PWMDIM in FIG. 5), inductors 510, 512, diode 514, capacitors 524, 516, switches 522, 526, sense resistor 534, controller 506, and LED array 508.

Input switch 502 may be implemented as a switch that may be operated at a same switching frequency as the switching frequency of switch 526, but relatively lower than the switching frequency of switch 522. In embodiments, switch 526 may be implemented as a dimming FET that mainly serves as an on/off switch that controls current flowing to the LEDs. The amount of current that flows through the LED array is controlled by the buck sub-circuit. Controller 506 may be implemented as an integrated circuit (IC) that regulates the voltage on capacitor 530 when input switch 502 is On. This is the boost controller function of controller 506. Now when the input switch is turned Off then controller 506 changes its function to regulate the current flowing though resistor 534, which then flows into LED array 508. LED driver 300 is not limited to the constructional detail shown there or described in the accompanying text.

In embodiments, inductor 510, switch 522, diode 514, and capacitor 524 form a boost sub-circuit within LED driver 500. Similarly, inductor 512, switch 522, diode 514, and capacitor 516 may form a buck sub-circuit that may be used to drive a load such as LED array 508. In embodiments, when the boost converter sub-circuit is turned On, the buck converter sub-circuit is turned Off and, conversely, when the buck circuit is turned On, the boost circuit is turned Off. Therefore, in embodiments, switch 522 and diode 514 may be used for both the boost and buck sub-circuits, such that LED driver 500 may operate as a single converter circuit that performs the functions of both a boost converter circuit and a buck converter circuit.

In embodiments, when the boost converter sub-circuit is activated, e.g., in response to pulsed dimming input signal 504 being set to a Low state, at least some parts of controller 506 may operate as a DC-DC regulator and in boost mode, such as to regulate the boost voltage at capacitor 524. In boost mode, LED array 508 may remain inactive, i.e., turned Off. In such embodiments, switch 522 may act as a boost converter switch, and diode 514 may act as a boost diode, and inductor 512 may remain unenergized.

In detail, in boost mode, once input switch 502 is closed, boost inductor 510 transfers energy from input power supply (represented by the voltage Vin in FIG. 5) to boost capacitor 524. In embodiments, the voltage at node 530 may be regulated as an output voltage, and switch 526 may be left open. In embodiments, the voltage at node 528 may be sensed and used in a control loop, e.g., to determine a duty cycle for switch 522, such as to control the voltage at node 530 to a predetermined output voltage. In embodiments, switch 522 may be switched with a relatively high frequency (e.g., 2 MHz).

In embodiments, once pulsed dimming input 504 is set to a High state, the boost converter sub-circuit is deactivated, i.e., turned Off, and controller 506 may activate the buck converter sub-circuit to drive LED array 508. In such embodiments, switch 522 may act as a buck converter switch, and diode 514 may act as a buck diode. In other words, boost switch 522 and boost diode 514 may perform dual functions, thereby, eliminating the need for two sets of switches and rectifying diodes, which advantageously reduces cost and simplifies LED driver 300.

Once the boost circuit is turned Off, i.e., PWMDIM is high, the buck converter sub-circuit may actively regulate a current flowing though LED array 508 that is turned On. In such embodiments, current sense resistor 534 may be used to detect the LED current flowing though buck inductor 512.

In detail, buck mode, switch 526 may be closed, input switch 502 is opened, such that the input power supply is disconnected from the input and LEDs 508 cannot draw any current from the input power supply. Instead, LEDs 508 may receive energy from boost capacitor 524, whose voltage starts to decline due to the fact that voltage Vin and, thus, the input power is cut off. In embodiments, controller 506 may regulate the load current such that LEDs 508 may be turned On, e.g., 1% of the time.

In embodiments, current at sense resistor 534 may be sensed and used in a control loop, e.g., to determine a duty cycle for switch 522 that now operates as a buck switch, e.g., at the same high frequency (e.g., 2 MHz) as in boost mode. As a result, the current in sense resistor 534 and, thus, the current flowing through LEDs 508 may be controlled to a predetermined level.

In embodiments, the switching frequency of input switch 502 is determined by the duty cycle of LEDs 508. In embodiments, since LEDs 508 are powered by capacitor 524, the amplitudes of the current that is handled by input switch 502 may be significantly reduced when compared to existing approaches. A person skilled in the art will appreciate that the teachings of the present disclosure may be applied to a wide variety of loads used in numerous applications that may benefit from a buck-boost arrangement. As those skilled in the art will further appreciate, a suitable system utilizing a driver may comprise more or less circuit components and control an output voltage instead an output current.

Figure 6:
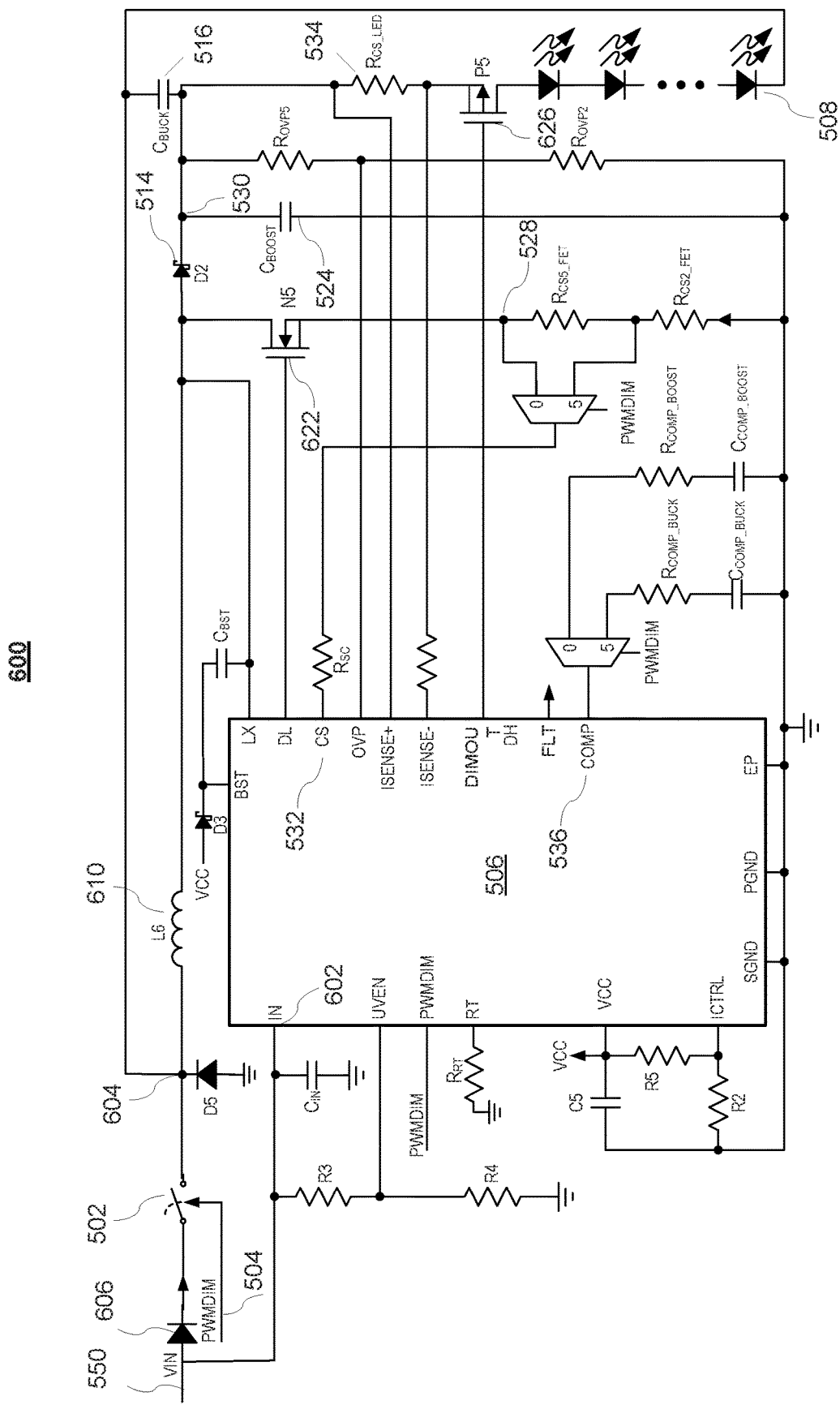
FIG. 6 illustrates an exemplary implementation of an LED driver with a single inductor for both boost and buck modes according to various embodiments of the new disclosure.

FIG. 6 illustrates an exemplary implementation of an LED driver with a single inductor 610 for both buck and boost modes according to various embodiments of the present disclosure. LED driver 600 shares some circuit components and structures with LED driver 500 depicted in FIG. 5 with several differences. Compared to the LED driver 500, LED driver 600 removes the inductor 512 depicted in FIG. 5, decouples the diode D5 from the input pin "IN" 604 in the controller 506, and adds a diode 606 coupled to the voltage input Vin. Additionally, in the LED driver 600, the voltage input Vin is directly fed into the input pin "IN" 602; the diode D5 couples to the single inductor 610; the capacitor 516 couples to the single inductor 610 at node 604 instead (due to the removal of inductor 512 depicted in FIG. 5).

In embodiments, the LED driver 600 operates in a boost mode as a boost DC-DC converter to charge the capacitor CBOOST 524 when PWMDIM signal is low. In the boost mode, the single inductor 610, switch 622 (also referred as a converter switch), diode 514, and capacitor 524 form a boost sub-circuit within LED driver 600. When PWMDIM is low, the switch 502 is closed and the switch P5 626 is open. The output voltage on CBOOST increases from battery input voltage to the regulation set point set by the resistor divider ROVP5 and ROVP2. In one or more embodiments, the voltage on OVP pin is regulated to 1.1V.

In embodiments, when the PWMDIM signal goes high the switch 502 is opened and the switch P5 626 is closed. The CBOOST capacitor 524 discharges into the LEDs. The LED driver 600 operates in a buck mode as a buck LED driver where the voltage on the CBOOST capacitor acts as the source of input power, and the LED string 508 is the load. In the buck mode, the single inductor 610, switch 622, diode 514, and capacitor 524 form a buck sub-circuit within LED driver 600. In one or more embodiments, the current in resistor RCS_LED 534 is regulated by the controller 506.

Although in FIG. 6, only a single inductor 610 is used for both buck mode and boost mode, one skilled in the art will recognize that the single inductor 610 may be referred as a single capacitor unit, which may comprise one or more capacitor elements in series, parallel, or a combination of both series and parallel. Such variations of a single capacitor unit shall still be within the scope of this invention disclosure.

Figure 7:
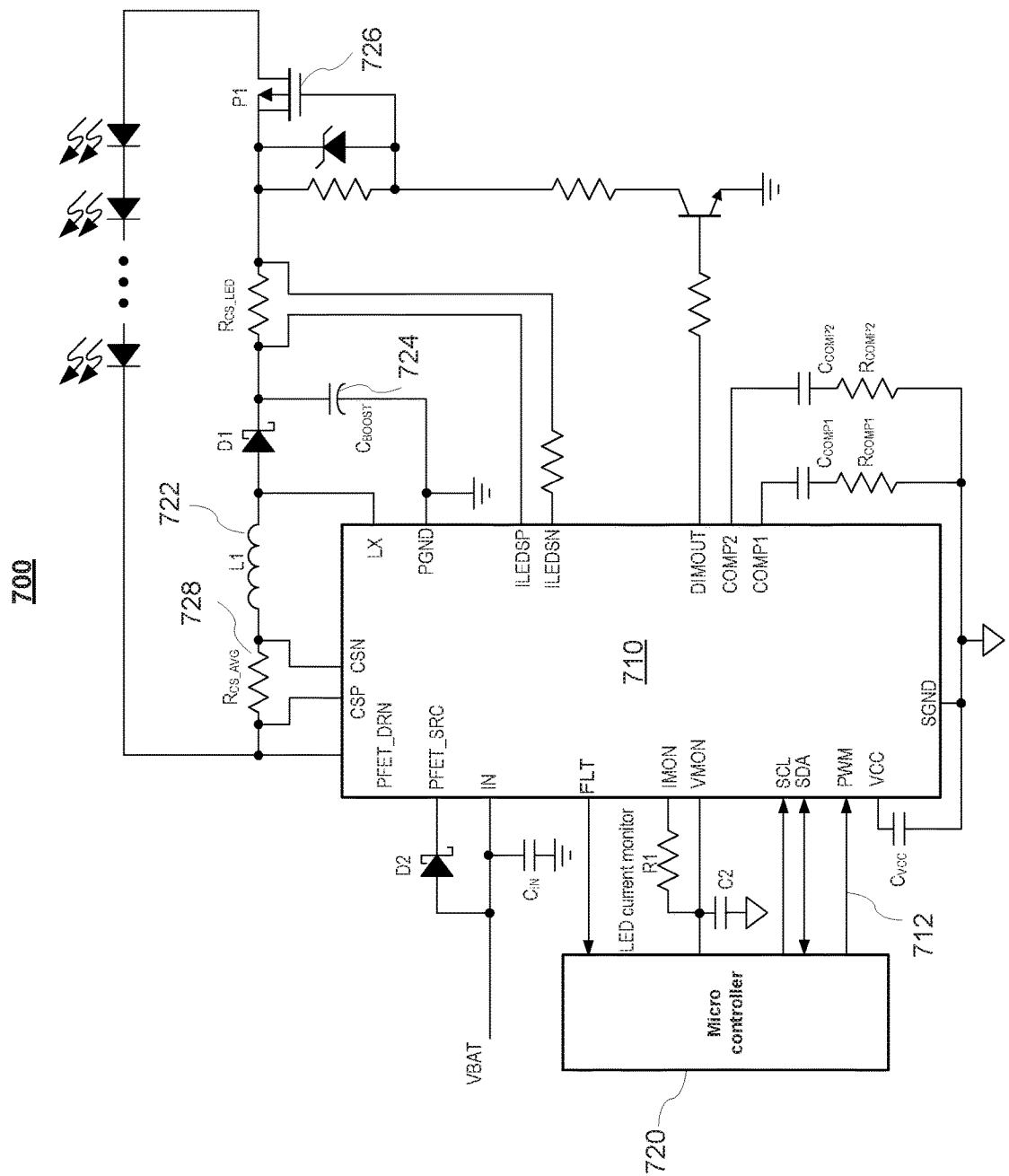
FIG. 7 illustrates an alternative exemplary implementation of an LED driver with a single inductor for both boost and buck modes according to various embodiments of the new disclosure.

FIG. 7 illustrates an alternative exemplary implementation of an LED driver 700 with a single inductor for both boost and buck modes according to various embodiments of the new disclosure. In the LED driver 700, the switch 502, the boost and buck switch 522 are integrated inside an integrated circuit 710. A single inductor 722 is used for both buck and boost mode operations of the LED driver 700.

In embodiments, LED driver 700 comprises a microcontroller 720 to provide various control signals, including the PWM signal 712, for driver control. When PWM signal is low, the LED driver 700 operates in a boost mode as a boost DC-DC converter to charge the capacitor CBOOST 724. When PWM signal 712 is low, the switch 502 is closed and the switch P1 726 is open. The output voltage on CBOOST increases from input voltage (battery input voltage VBAT) to a predetermined regulation set point.

In embodiments, when the PWMDIM signal goes high, the battery input is disconnected and the switch 726 is closed. The LED driver 700 operates in a buck mode. The CBOOST capacitor 724 acts as the source of input power and discharges into the LEDs. The disconnection of the battery input in the buck mode allows the buck driver to work down to zero volts at cathode of the LED string. Because the CBOOST capacitor 724 may be discharged to very low voltage, or even to zero volt theoretically, the effective utilization of the stored energy in the CBOOST capacitor 724 is increase. Therefore, the CBOOST capacitor 724 may have a smaller capacitance to meet discharge current requirement which would otherwise requires a larger capacitor. This smaller capacitance requirement provides an economic advantage for the LED driver.

In embodiments, when the LED driver 700 operates in a boost mode to charge the CBOOST capacitor 724, the charging current for the CBOOST capacitor 724 is kept constant until the voltage of CBOOST capacitor 724 reaches a predetermined regulation voltage. In embodiments, a current sensing resistor 728 is in series connection to the single inductor 722 to monitor the current through the single inductor 722 and enable an average current mode control instead of peak current mode control for the integrated circuit 710. In embodiments, switching frequencies for boost and buck modes are set the same, e.g. as 2.2 MHz with spread spectrum.

At the beginning of the boost mode, the voltage on the CBOOST capacitor 724 is low and a large inrush current might be generated initially. In one or more embodiments, an inrush limiting p-channel Field-effect transistor (PFET) may be integrated in integrated circuit 710 to limit the inrush current within a predetermined threshold.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A circuit comprising:
a first switch coupled a power supply;
a second switch coupled to a load;
a capacitor coupled to the load via the second switch; and
a converter coupled between the power supply and the load, the converter comprising an inductor, a diode, and a converter switch, in a boost mode, the converter operates as a boost converter, the second switch is off, and the first switch switches on for the power supply to charge the capacitor; in a buck mode, the converter operates as a buck converter and the second switch switches on for the capacitor to drive the load, the inductor and the diode are used in both the boost mode and the buck mode.

2. The circuit of claim 1 wherein the power supply is a battery.

3. The circuit of claim 1 wherein the first switch switches off in the buck mode.

4. The circuit of claim 1 wherein the converter operates in the boost mode, a boost sub-circuit comprising at least the inductor, the converter switch, the diode, and the capacitor is formed to charge the capacitor.

5. The circuit of claim 1 wherein the converter operates in the buck mode, a buck sub-circuit comprising at least the inductor, the converter switch, the diode, and the capacitor is formed to drive the load.

6. The circuit of claim 1 and further comprising
a controller coupled to the converter switch for switch control, the controller regulates voltage at the capacitor in the boost mode and regulates current of the load in the buck mode.

7. The circuit of claim 6 wherein the first switch, the converter switch, and the controller are integrated inside an integrated circuit.

8. The circuit of claim 1 wherein the converter switch has a switching frequency the same for the boost mode and the buck mode.

9. The circuit of claim 1 wherein in the boost mode, the capacitor is charged with a constant charging current until the capacitor has a voltage reaches a predetermined regulation voltage.

10. A method of operating a converter, the method comprising:
in a boost mode, coupling the converter to a power supply and operating the converter as a boost converter to charge a capacitor, the converter comprising a single inductor, a diode, and a converter switch;

decoupling the power supply from the converter after the capacitor is charged to a predetermined regulation voltage; and in a buck mode, coupling the converter to a load and operating the converter as a buck converter to drive the load with the capacitor, the single inductor, the diode, and the converter switch are used in both the boost mode and the buck mode.

11. The method of claim 10 wherein in the boost mode, a first switch is switched on to couple the power supply to the converter, the first switch is switched off in the buck mode.

12. The method of claim 11 wherein in the buck mode, a second switch is switched on to couple the converter to the load, the second switch is switched off in the boost mode.

13. The method of claim 12 wherein the first switch has a switching frequency the same as the second switch.

14. The method of claim 10 wherein the converter switch has a switching frequency the same for the boost mode and the buck mode.

15. The method of claim 10 wherein the load is a light-emitting diode (LED) string comprising one or more LEDs.

16. The method of claim 10 wherein the capacitor is a capacitor unit comprising one or more capacitor elements coupled in series, in parallel, or in a combination of both series and parallel.

17. A converter comprising:

an inductor;

a diode;

a capacitor coupled to the inductor via the diode;

a converter switch coupled to the inductor and the capacitor; and a controller coupled to the converter switch for switch control, in a boost mode, the controller operates the converter as a boost converter to charge the capacitor using an external power supply, in a buck mode, controller operates the converter as a buck to drive a load using the capacitor as a source of input power, the converter switch, the inductor and the diode are used in both the boost mode and the buck mode.

18. The converter of claim 17 wherein the controller regulates voltage at the capacitor in the boost mode and regulates current of the load in the buck mode.

19. The converter of claim 18 wherein in the boost mode, the capacitor is charged with a constant charging current until the capacitor has a voltage reaches a predetermined regulation voltage.

20. The converter of claim 17 wherein the converter switch has a switching frequency the same for the boost mode and the buck mode.

* * * * *